US011995584B2

(12) United States Patent
Spengler

(10) Patent No.: US 11,995,584 B2
(45) Date of Patent: May 28, 2024

(54) TRAINING ASSIGNMENT TOOL

(71) Applicant: Providence St. Joseph Health, Seattle, WA (US)

(72) Inventor: Joseph Michael Spengler, Mukilteo, WA (US)

(73) Assignee: Providence St. Joseph Health, Renton, WA (US)

( * ) Notice: Subject to any disclaimer, the term of this patent is extended or adjusted under 35 U.S.C. 154(b) by 245 days.

(21) Appl. No.: 17/314,881

(22) Filed: May 7, 2021

(65) Prior Publication Data
US 2022/0358445 A1 Nov. 10, 2022

(51) Int. Cl.
*G06Q 10/00* (2023.01)
*G06Q 10/0631* (2023.01)
*G06Q 10/10* (2023.01)
*G09B 7/02* (2006.01)

(52) U.S. Cl.
CPC ..... *G06Q 10/063114* (2013.01); *G06Q 10/10* (2013.01); *G09B 7/02* (2013.01)

(58) Field of Classification Search
CPC .............. G06Q 10/10; G06Q 10/063; G06Q 10/063114; G06Q 10/063112; G06Q 10/0639; G06Q 10/06393; G06Q 10/06395; G06Q 10/06398
See application file for complete search history.

(56) References Cited

U.S. PATENT DOCUMENTS

| | | | | |
|---|---|---|---|---|
| 8,535,059 | B1* | 9/2013 | Noble, Jr. | G09B 7/02 379/265.06 |
| 8,548,929 | B1* | 10/2013 | Goodwin | G06Q 10/06 705/320 |
| 2010/0028845 | A1* | 2/2010 | Myer | G09B 7/02 434/323 |
| 2015/0186538 | A1* | 7/2015 | Yan | G06F 40/12 707/722 |
| 2016/0299916 | A1* | 10/2016 | Prasanna | G06F 16/2365 |
| 2016/0358115 | A1* | 12/2016 | Gustafson | G06Q 10/06395 |
| 2018/0032957 | A1* | 2/2018 | Gouvernel | H04L 67/306 |
| 2019/0035297 | A1* | 1/2019 | Barrett | G09B 19/00 |
| 2021/0133196 | A1* | 5/2021 | Gladwin | G06F 16/24564 |

OTHER PUBLICATIONS

Shahri, H. H., & Shahri, S. H. (2006). Eliminating duplicates in information integration: An adaptive, extensible framework. IEEE Intelligent Systems, 21(5), 63-71 (Year: 2006).*

* cited by examiner

*Primary Examiner* — William S Brockington, III
(74) *Attorney, Agent, or Firm* — Seed Intellectual Property Law Group, LLP

(57) ABSTRACT

A facility for organizing worker records is configured to assist users in assigning training classes to the workers. The facility obtains new worker records identifying one or more workers and accesses existing worker records from a repository of worker records. The facility merges the new worker records and the existing worker records, and identifies duplicate records within the merged records. The facility removes the duplicate record from the merged records. The facility presents visual information describing one or more training classes which may be assigned to the one or more workers. The facility obtains user input specifying that at least one of the one or more training classes be assigned to at least one of the one or more workers.

24 Claims, 12 Drawing Sheets worker data table 300

| Worker ID | Date Updated | Worker Name | Worker Group | Worker Contact Information | Supervisor ID |
|---|---|---|---|---|---|
| 1111 | 3/12/2021 | Jack Smith | ER Nurse | jacksmith@health.com | 5555 |
| 2222 | 3/10/2021 | Jill Smith | Respiratory Nurse | jsmith@health.com | 5555 |
| 3333 | 3/2/2021 | Mary Shepherd | Medical Student | mshepherd@health.com | 5555 |
| 4444 | 10/2/2020 | Peter Framer | Physician | pframer@health.com | 5555 |
| 5555 | 10/2/2019 | George James | Training Supervisor | gjames@health.com | N/A |
| ... | ... | ... | ... | ... | ... |

310 311 312 313 314 315

301 302 303 304 305

FIG. 3 training class data table

| Training Class ID | Date of Class | Training Class group | Training Class location |
|---|---|---|---|
| T1000 | 3/21/2021 | Nurses | trainingclasslink.com/t1000 |
| T2000 | 3/20/2021 | Students | trainingclasslink.com/t2000 |
| T3000 | 4/15/2021 | All Practitioners | 1234 Health Drive, Seattle WA |
| ⋮ | ⋮ | ⋮ | ⋮ |

*FIG. 5*

FIG. 9 assigned training class data table

| Training Class ID | Assigned Worker | Class Completed |
|---|---|---|
| T1000 | 1111 | No |
| T1000 | 2222 | Yes |
| T2000 | 3333 | Yes |
| T3000 | 1111 | Yes |
| T3000 | 2222 | Yes |
| T3000 | 3333 | No |
| T3000 | 4444 | No |
| ⋮ | ⋮ | ⋮ |

*FIG. 12*

TRAINING ASSIGNMENT TOOL

BACKGROUND

Workers routinely attend training courses, such as as part of an onboarding process for an organization. Coordinators typically assign these training courses to ensure that workers have the proper training for their position.

BRIEF DESCRIPTION OF THE DRAWINGS

FIG. 3 is a table diagram showing sample contents of a worker data table used by the facility in some embodiments to store worker records.

FIG. 5 is a table diagram showing sample contents of a training class data table used by the facility in some embodiments to store training class data.

FIG. 9 is a display diagram showing a sample worker record screen presented by the facility in some embodiments in order to assign training classes to a worker.

FIG. 12 is a table diagram showing sample contents of an assigned training class data table used by the facility in some embodiments to store data regarding whether a worker has completed a training class.

DETAILED DESCRIPTION

Figure 1:
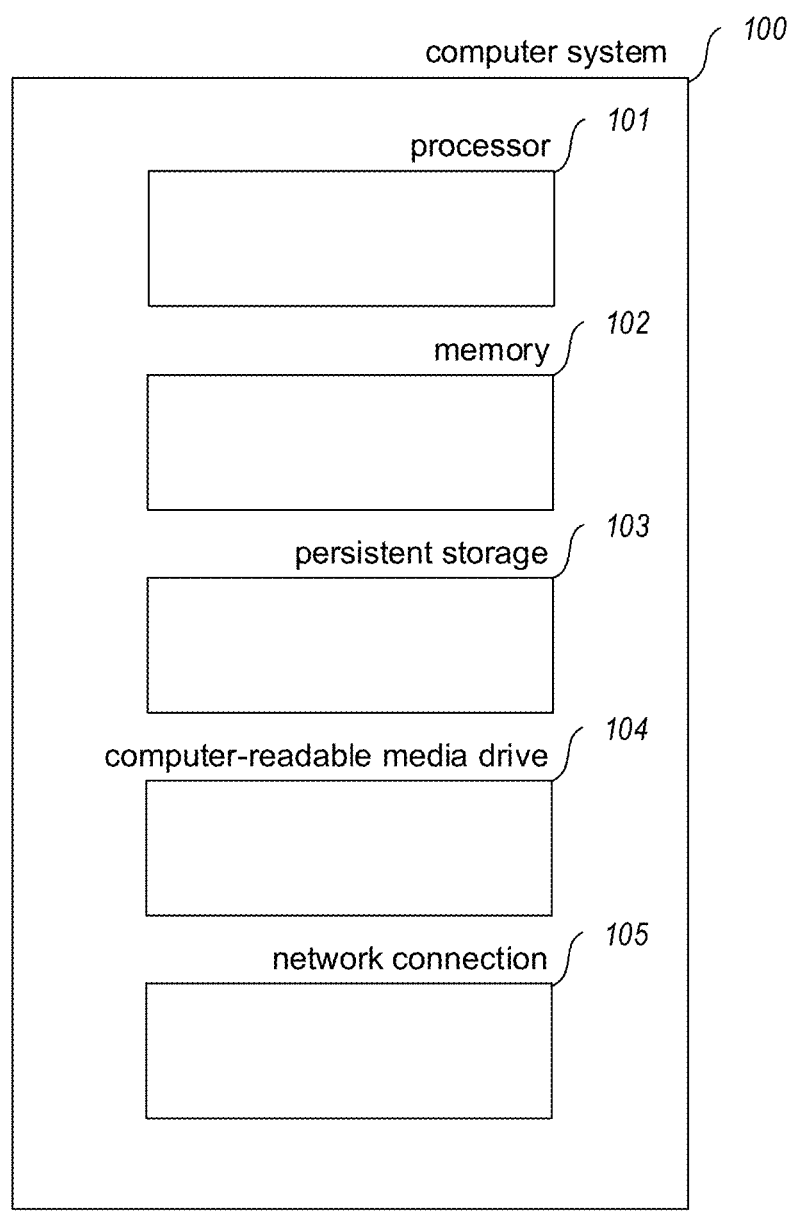
FIG. 1 is a block diagram showing some of the components typically incorporated in at least some of the computer systems and other devices on which the facility operates.

The inventors have identified important disadvantages of conventional approaches to assigning training courses to workers. First, conventional methods identify prospective students using records that contain duplicate entries for workers, which coordinators must manually remove to ensure that the records can be accurately used to assign training courses. Data about students must also be organized and formatted in a specific manner in order to assign training courses in a way that is accepted by training program providers. Additionally, because of the large number of training classes and differences between worker types, users must manually keep track of which training classes have been assigned and what types of training classes each worker requires. Furthermore, class specifics change frequently, which makes maintaining a database of class details impractical.

In response to recognizing these disadvantages, the inventors have conceived and reduced to practice a software and/or hardware facility for assigning training courses to workers ("the facility"). The facility removes inefficiencies present in current methods of assigning training courses and allows users to quickly and easily assign training courses to workers.

In some embodiments, the facility obtains new records for a group of workers and removes any duplicates of existing records. In some embodiments, the records for the group of workers are obtained from a repository of workers. In some embodiments, the records for the group of workers are obtained via user input. In some embodiments, the facility removes duplicates of existing records by comparing the existing records to the new records and identifying any new or different information for each of the workers. In some embodiments, the facility flags potential duplicates which cannot be verified as duplicates. In some embodiments, the facility maintains a log documenting changes made to the records.

In some embodiments, the facility includes a training selection tool that recommends training classes to assign to a worker. In some embodiments, the training selection tool recommends training classes based on one or more of: the facility that the worker works at, the worker's specialty, the worker's previous experience, training classes taken by similar workers, etc. In some embodiments, once the curriculum is assigned, the facility groups the workers by curriculum. In some embodiments, the facility allows a user to copy records for workers and assign them a training class once the workers are grouped.

In some embodiments, the facility obtains a list of training classes and groups the training classes in the list. In some embodiments, the facility groups the training classes based on information included in the list of training classes, such as the name of the training class. In some embodiments, the facility periodically obtains the list of training classes and updates the groupings of the training classes. In some embodiments, the facility removes duplicates of existing classes from the list of training classes.

In some embodiments, the facility maintains temporary class notes for each class, including details of the class such as the date, time, location, etc. In some embodiments, the facility obtains the class notes via user input. In some embodiments, the class notes are stored by the facility until a user session ends.

In some embodiments, when assigning a training class, the facility identifies a worker's supervisor and other information. In some embodiments, the facility obtains an indication of whether the worker completed the training class. In some embodiments, the facility notifies the worker's supervisor if the training class is not completed.

In some embodiments, the facility displays communications between a worker, their supervisor, and a user. In some embodiments, the facility automatically captures replies to messages between two or more of: a worker, their supervisor, and a user, regarding the training class. In some embodiments, the facility automatically trims messages, such as email chains, to display only the recent messages.

By performing in some or all of the ways described above, the facility allows users to more efficiently assign training classes for workers. Also, the facility improves the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with lesser latency, and/or preserving more of the conserved resources for use in performing other tasks. For example, by removing duplicate entries early on, the facility is able to allow users to assign training classes and keep up-to-date records in a way which consumes less processing power and memory because there are no duplicate records taking space, and there are fewer user interface interactions necessary to remove duplicate records. Additionally, storing temporary notes for each training class allows a user to quickly enter necessary information, without requiring the facility to expend extra processing power and memory to maintain and continuously update the training class details.

FIG. 1 is a block diagram showing some of the components typically incorporated in at least some of the computer systems and other devices on which the facility operates. In various embodiments, these computer systems and other devices 100 can include server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, the computer systems and devices include zero or more of each of the following: a processor 101 for executing computer programs and/or training or applying machine learning models, such as a CPU, GPU, TPU, NNP, FPGA, or ASIC; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 2:
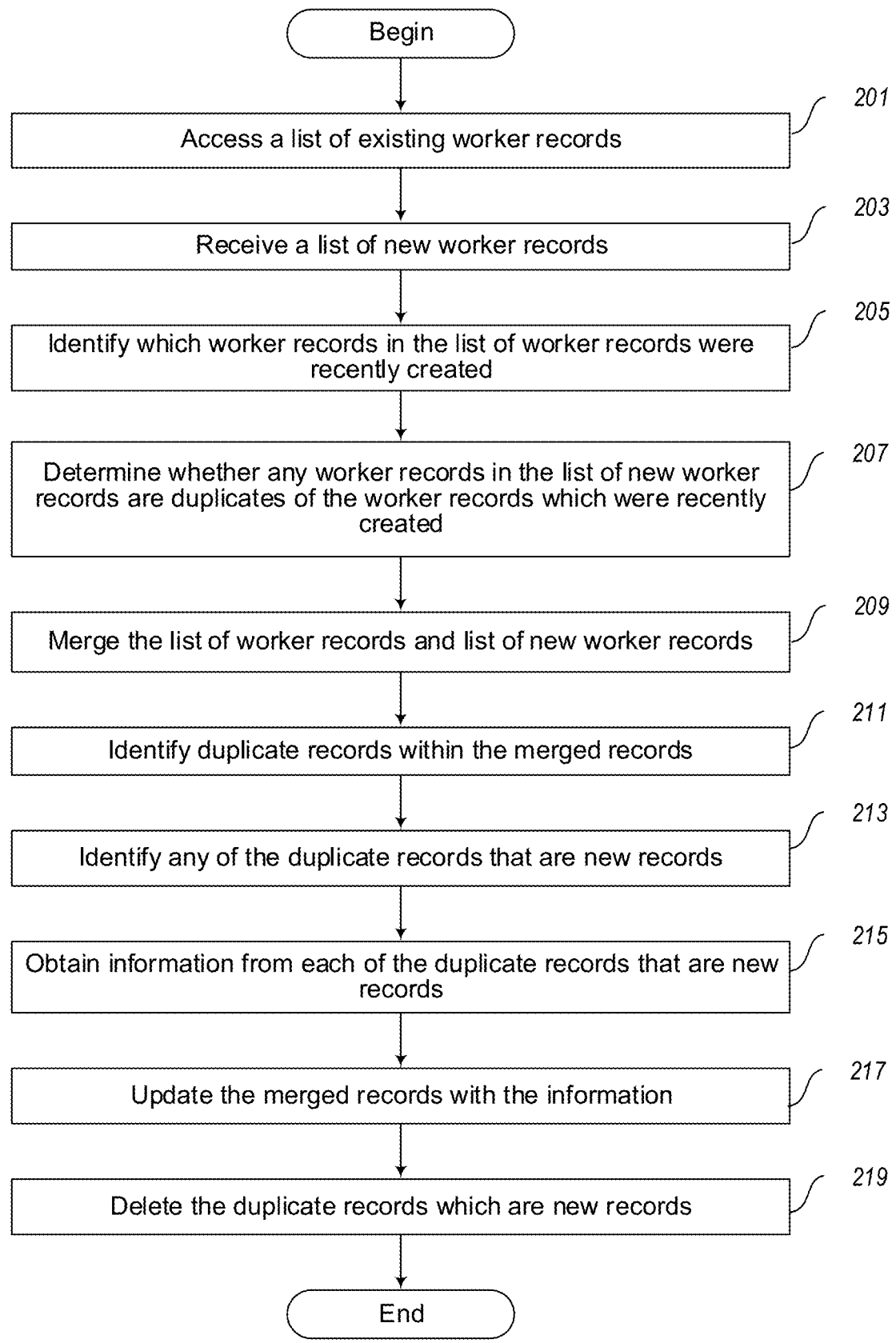
FIG. 2 is a flow diagram showing a process to detect and remove duplicate records, performed by the facility in some embodiments.

FIG. 2 is a flow diagram showing a process to detect and remove duplicate records, performed by the facility in some embodiments. At act 201, the facility accesses a list of records for existing workers. In some embodiments, the facility accesses these existing worker records in a repository of worker records. In some embodiments, the worker records include a worker identifier, when the record was created, updated, etc., demographic information about the worker, the worker's role or occupation, the worker's contact information, supervisor information, etc.

At act 203, the facility receives a list of new worker records. In some embodiments, the facility receives the new worker records from the repository of worker records, from user input, from a system which manages worker records, etc. In some embodiments, the facility trims the new worker records to only include data needed for training. In some embodiments, the facility formats each record of the new worker records to be compatible with the repository of worker records, one or more training assignment tools, training assignment systems, etc.

At act 205, the facility identifies which worker records in the list of worker records were recently created. In some embodiments, the facility determines whether the record was created within a predetermined period of time based on a date the record was created, updated, filed, etc. In some embodiments, the facility determines when the record was created, updated, filed, etc., based on logs kept by the facility, a date stored within the worker record, etc. In some embodiments, a worker record is flagged as a new record when it is created and updated. In some embodiments, the worker record is flagged as a new record when the record when a class is assigned to the worker. In some embodiments, the facility removes the flag that a record is a new record based on a condition occurring, such as a predetermined period of time passing since the update or creation of the record, a predetermined number of new records are added, etc.

In some embodiments, the facility identifies whether a record was recently created based on missing data within the record, such as a missing start date, name, ID, etc. In some embodiments, where the facility identifies whether a record is recently created based on a missing start date, the facility removes the start date from the record when it is added based on how far away in the past or future the start date is from the current date.

At act 207, the facility determines whether any of the worker records in the list of new worker records are duplicates of the worker records that were recently created. In some embodiments, the facility determines whether the records are duplicate records based on certain criteria, such as data stored in the record, such as the worker ID, the worker's demographic information, a start date of employment, the worker's name, the worker's contact information, etc. In some embodiments, the facility weighs one or more of the criterion when determining whether the records are duplicate records. In some embodiments, the when a determination of whether or not a worker record is a duplicate cannot be made, the facility flags the record as a potential duplicate. In some embodiments, when a potential duplicate is flagged, the facility transmits an indication to a user to review whether or not the record is a duplicate.

At act 209, the facility merges the list of worker records and the list of worker records to create a merged list of worker records.

At act 211, the facility identifies duplicate records within the merged records. In some embodiments, the duplicate records identified in act 211 do not include the duplicate records identified in act 207. In some embodiments, the duplicate records are determined using a similar process to the determination of whether a record is a duplicate record in act 207. In some embodiments, when the duplicate record is a new record, the facility flags the duplicate record as a new record.

At act 213, the facility identifies whether any of the duplicate records are new records. In some embodiment, the facility identifies the duplicate record as a new record based on a flag that the duplicate record is a new record. In some embodiments, the facility identifies whether the duplicate records are new records by comparing the identified duplicate records to the new records.

At act 215, the facility obtains information from each of the duplicate records that are new records. In some embodiments, the facility obtains the information from the duplicate records that are new records by comparing the information stored in the duplicate record and new record, and identifies which information in the new record is different than the information in the duplicate records.

At act 217, the facility updates the merged records with the obtained information. In some embodiments, the facility maintains a log of changes to worker records which are made when the merged records are updated with the obtained information.

At act 219, the facility deletes the duplicate records which are new records. For example, the facility may access a first record for "John Doe" which includes contact information. The facility may receive a new record for "John Doe" which has different contact information. The facility may recognize that the first record and the new record are duplicate records after merging the records, and extract the contact information from the new record. In response, the facility updates the first record using the extracted contact information, and deletes the new record. In some embodiments, the facility uploads the merged records to the worker record repository. In some embodiments, the facility uploads the merged records to the worker record repository in batches. After act 219, the process ends.

In some embodiments, the facility performs acts 213-219 with respect to the new records and the recently created records after act 207 and before continuing to act 209. For example, if the facility detected that the record for "John Doe" in the previous example was a recently created record, it would perform that same process after act 207, and then would not need to perform the process again in acts 211-219, unless another duplicate of the record was found. In this manner, the facility is able to reduce the amount of records which are merged, as well as the amount of records which are checked for duplicates. Thus, the facility is able to use this process to conserve additional computing resources and processing power on top of the conserved computing resources and processing power which is already conserved by acts 201-219 as they appear in FIG. 2.

Those skilled in the art will appreciate that the acts shown in FIG. 2 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

FIG. 3 is a table diagram showing sample contents of a worker data table 300 used by the facility in some embodiments to store worker records. In the sample worker data table 300, rows 301-305 each represent a worker record describing a worker. The rows are divided into a worker id column 310, a date updated column 311, a worker name column 312, a worker group column 313, a worker contact information column 314, and a supervisor id column 315. The worker id column 310 includes information indicating an identifier for a worker. The date updated column 311 includes information indicating when the worker record was last updated. The worker name column 312 includes information indicating a name for the worker. The worker group column 313 includes information indicating one or more groups assigned to the worker. The worker contact information column 314 includes information indicating contact information for the worker. The supervisor id column 315 includes information indicating one or more identifiers for a worker's supervisor. In some embodiments, the worker data table includes additional columns for other data, such as a start date, a flag that the record is new, information regarding which office, site, ministry, etc. the worker works in, information regarding which training classes the worker is required to take, the worker's job title, additional worker groups, etc. In some embodiments, data table used to store data for healthcare workers.

For example, row 301 includes information for Jack Smith, an ER Nurse whose record was updated on Mar. 12, 2021, and whose supervisor's ID is "5555." Likewise, row 305 includes information for George James, a training supervisor, who is listed as the supervisor for each of the workers represented by rows 301-304. The sample worker data table of FIG. 3 includes sample data used by the facility in a healthcare setting, however, in embodiments where the facility is used in a non-healthcare setting, the sample worker data table may be altered to include data relevant to the non-healthcare setting.

While FIG. 3 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed, encrypted, and/or indexed; may contain a much larger number of rows than shown, etc.

Figure 4:
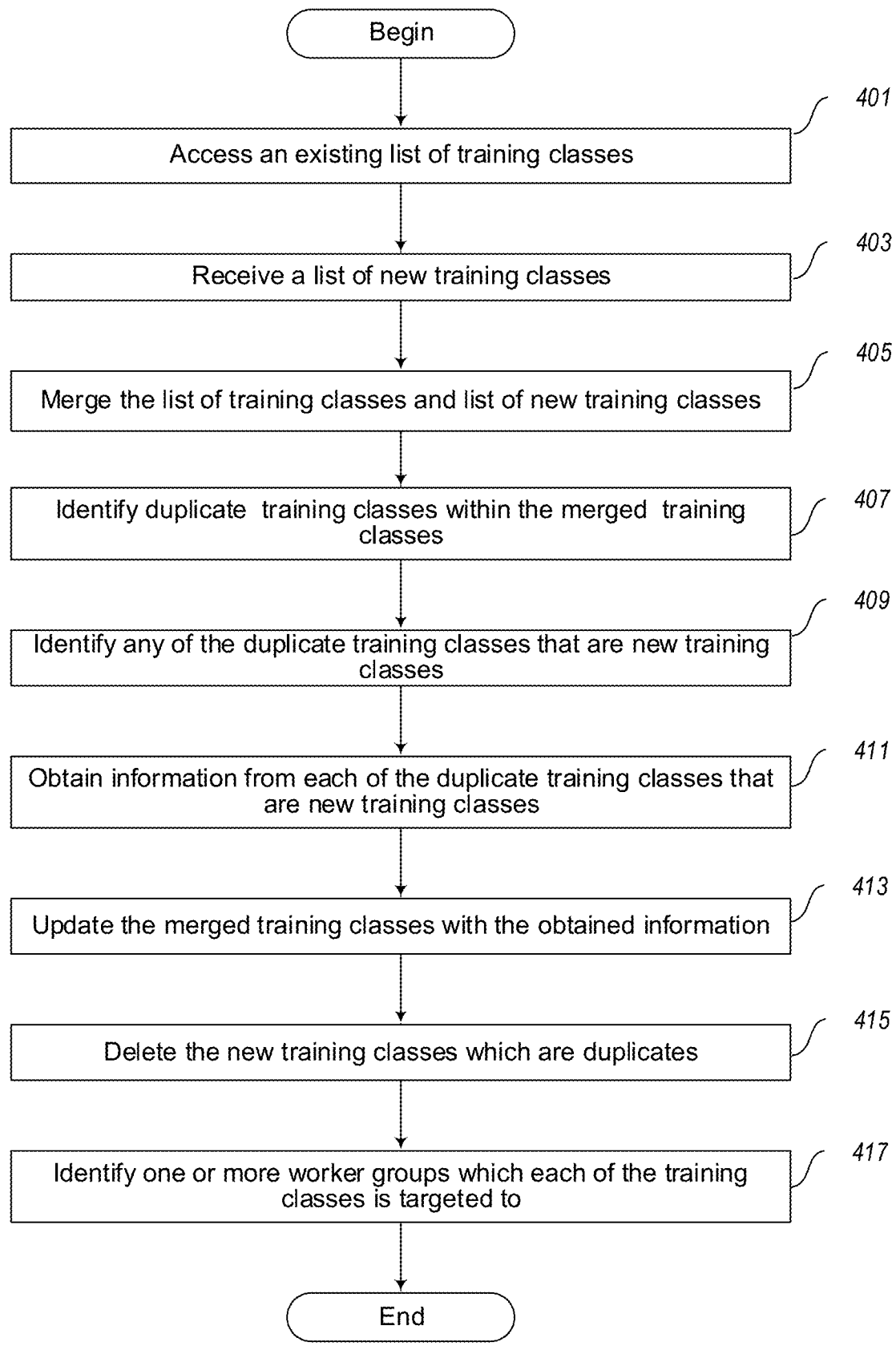
FIG. 4 is a flow diagram showing a process to obtain training classes used by the facility in some embodiments.

FIG. 4 is a flow diagram showing a process to obtain training classes used by the facility in some embodiments. At act 401, the facility accesses training class data including an existing list of training classes. In some embodiments, the facility accesses the training class data from a repository of training classes, from user input, another facility configured to assign training classes, etc.

At act 403, the facility receives new training class data including a list of new training classes. In some embodiments, the facility receives the new training class data from a repository of training classes, from user input, another facility configured to assign training classes, etc.

At act 405, the facility merges the list of training classes and the list of new training classes. In some embodiments, before merging the list of training classes and the list of new training classes, the facility identifies training classes which were recently created or updated and checks whether the recently created or updated training classes are duplicates in a similar manner to acts 205 and 207 described in FIG. 2.

At act 407, the facility identifies duplicate training classes within the list of merged training classes. In some embodiments, the facility identifies duplicate training classes by comparing one or more characteristics of the training classes, such as a name of the training class, a date that the training class occurs, a time the training class occurs, a subject of the training class, a suggested worker type to take the training class, etc. In some embodiments, the facility weighs each of the characteristics in determining whether a training class is a duplicate. In some embodiments, the facility flags a record of a training class if it cannot determine whether or not the training class is a duplicate.

At act 409, the facility identifies any of the duplicate training classes that are new training classes. At act 411, the facility obtains information from each of the duplicate training classes that are new training classes. At act 413, the facility updates the merged training classes with the obtained information. At act 415, the facility deletes the new training classes which are duplicates. The facility performs acts 409-415 in a similar manner to acts 211 and 219 described in FIG. 2.

At act 417, the facility identifies one or more worker groups which each of the training classes is targeted to. In some embodiments, the facility identifies the worker groups based on one or more of: the training class name, similar classes which have been assigned a worker group, and any other characteristics of the training class which the facility obtained with the training class data. The process ends after act 417.

FIG. 5 is a table diagram showing sample contents of a training class data table 500 used by the facility in some embodiments to store training class data. Rows 501-503 of training class data table 500 each include information describing a different training class. The rows are divided into the following columns: a training class id column 510, a date of class column 511, a training class group 513, and a training class location 514. The training class id column 510 includes information specifying an identifier for a training class. The date of class column 511 includes information specifying when the class occurs. The training class group column 513 includes information specifying one or more worker groups which can take the training class. The training class location column 514 includes information specifying where the training class is located. In some embodiments, the facility uses the training class data table in a healthcare setting.

For example, row 501 includes information specifying a training class with an ID of T1000, that takes place on Mar. 21, 2021, is meant for "Nurses," and includes a hyperlink to the training class. Likewise, row 503 includes information specifying a training class with an ID of T3000, takes place on Apr. 15, 2021, is meant for all practitioners, and takes place at a certain address. The sample training class data table of FIG. 5 includes sample data used by the facility in a healthcare setting, however, in embodiments where the facility is used in a non-healthcare setting, the sample training class data table may be altered to include data relevant to the non-healthcare setting.

Figure 6:
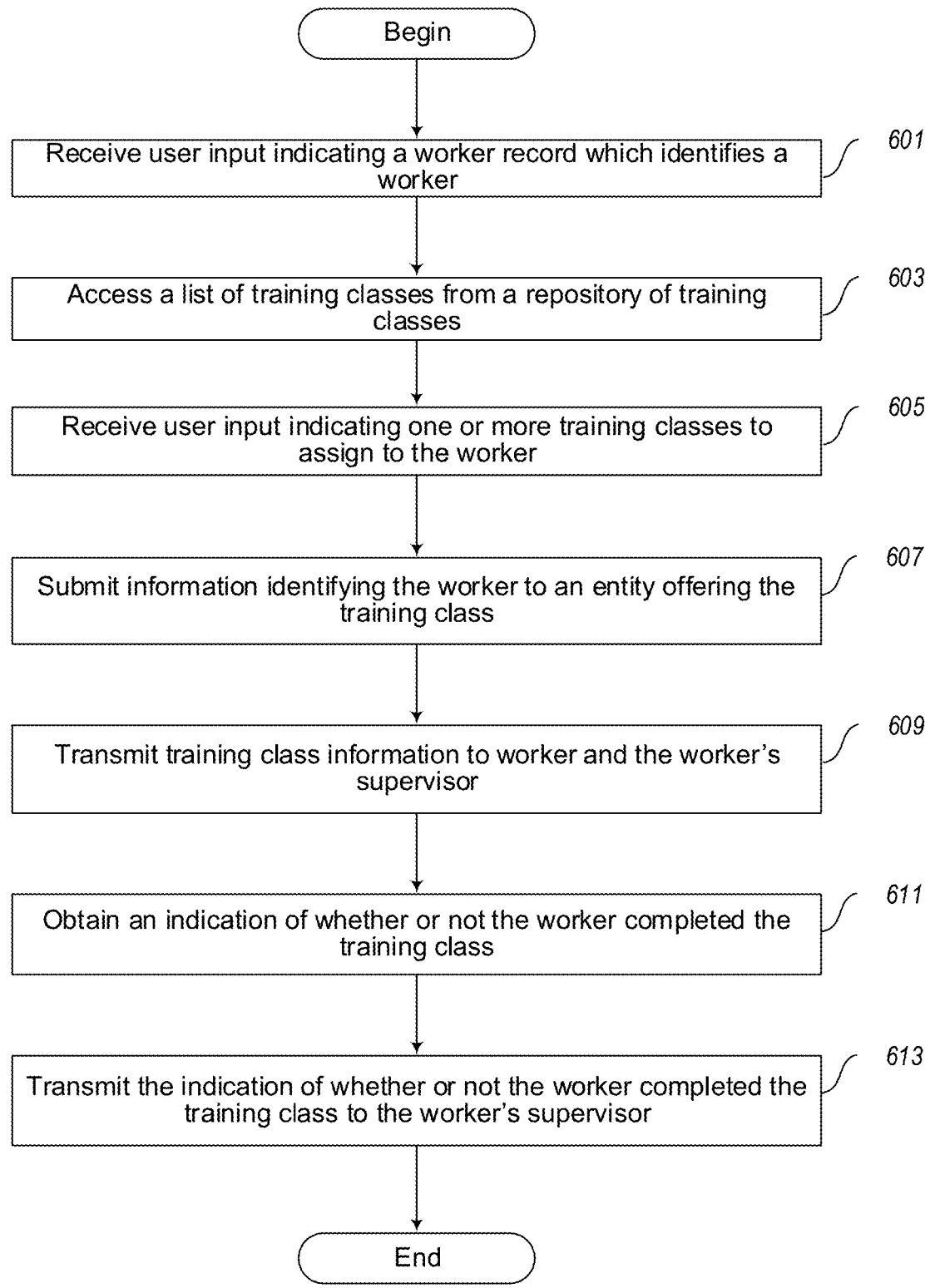
FIG. 6 is a flow diagram showing a sample process to assign training classes used by the facility in some embodiments.

FIG. 6 is a flow diagram showing a sample process to assign training classes used by the facility in some embodiments. In some embodiments, the facility performs the process to assign training classes by using screens, such as the screens described with regards to FIGS. 7-11. While the screens described in FIGS. 7-11 are used in a healthcare setting, those with skill in the art will realize that the screens can be adapted for use in a non-healthcare setting.

At act 601, the facility receives user input indicating a worker record which identifies a worker. In some embodiments, the facility performs act 601 by displaying start screen to the user.

At act 603, the facility accesses a list of training classes from a repository of training classes. At act 605, the facility receives user input indicating one or more training classes to assign the worker. At act 607, the facility transmits information identifying the worker to an entity offering the training class. In some embodiments, the information identifying the worker is formatted to conform to data standards set by the entity offering the training class worker data is formatted here for it. In some embodiments, the facility formats the information when the training class is selected. In some embodiments, the facility formats the information when worker data is added, during the process described in FIG. 2. In some embodiments, the facility obtains worker data for each worker assigned to the training class during the user session, and transmits the data to the entity offering the training class as a batch.

At act 609, the facility transmits training class information to the worker and the workers supervisor. At act 611, the facility obtains an indication of whether or not the worker completed the training class. In some embodiments, the facility obtains the indication of whether or not the worker completed the training class via user input. In some embodiments, the facility obtains the indication of whether or not the worker completed the training class from the entity offering the training class. At act 613, the facility transmits the indication of whether or not the worker completed the training class to the workers supervisor.

After act 613, the process ends.

Figure 7:
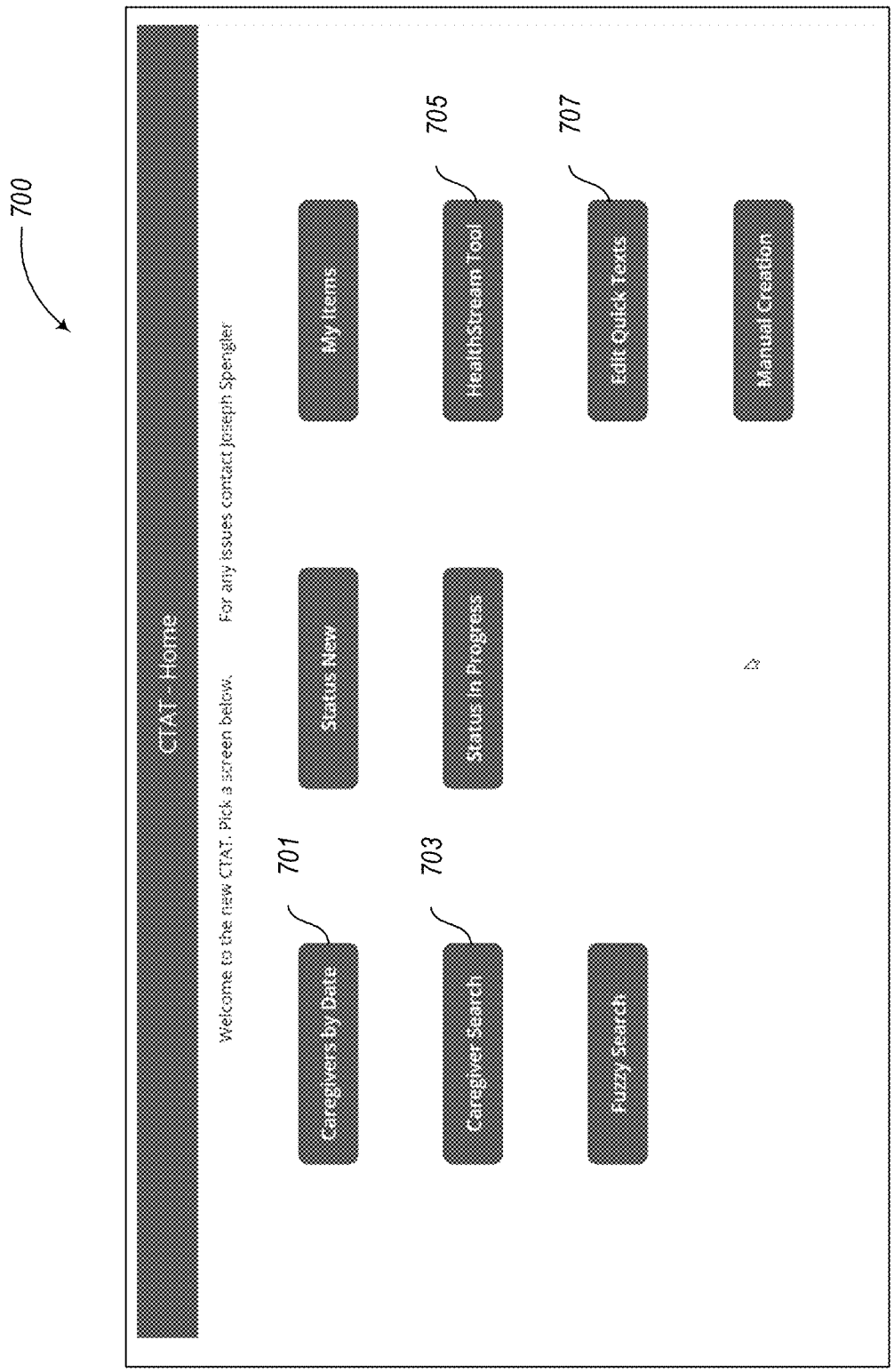
FIG. 7 is a display diagram showing a sample start screen presented by the facility in some embodiments to a user.

FIGS. 7-11 show a variety of sample screens presented by the facility to obtain user input to assign training classes and implement the process described in FIG. 6. FIG. 7 is a display diagram showing a sample start screen 700 presented by the facility in some embodiments to a user. The start screen 700 includes a caregivers by date button 701, a caregiver search button 703, a healthstream tool button 705, and an edit quick texts button 707. When the caregivers by date button 701 is activated, the facility obtains worker records and displays the worker records based on the date they were updated in a caregiver screen. When the caregiver search button 703 is activated, the facility presents a user interface used to search for a worker. When the healthstream tool 705 is activated, the facility presents a training class screen to the user. When the edit quick texts button 707 is activated the facility presents a screen used to define temporary data for a training class. In some embodiments, the temporary data for the training class is applied to one or more workers when the training class is assigned to the worker. In some embodiments, the facility keeps track of a user session, and the facility deletes the temporary data when the session ends.

In some embodiments, the start screen 700 includes additional buttons, such as buttons for performing a fuzzy search for a caregiver, starting the process of assigning a training class, obtaining training class assignments which are in the progress of being assigned, etc.

Figure 8:
FIG. 8 is a display diagram showing a sample caregiver screen presented by the facility in some embodiments in order to present caregiver information to a user.

FIG. 8 is a display diagram showing a sample caregiver screen 800 presented by the facility in some embodiments in order to present caregiver information to a user. The caregivers screen 800 includes a name column 801, a neo date column 803, a position column 805, a ministry column 807, and region selector 809. The name column 801 includes information identifying the name for each worker. The neo date column 803 includes information indicating the start date of each worker. The position column 805 includes information indicating the worker's role within the organization. The ministry column 807 includes information indicating a region, branch, etc. within the organization that the worker belongs to. The region selector 809 may be used to select a certain region, and prompt the facility to display workers from the selected region. In some embodiments, the facility displays a worker record screen 900 when a user interacts one of the rows indicating a worker, such as by clicking, tapping, etc. the row.

Figure 9:
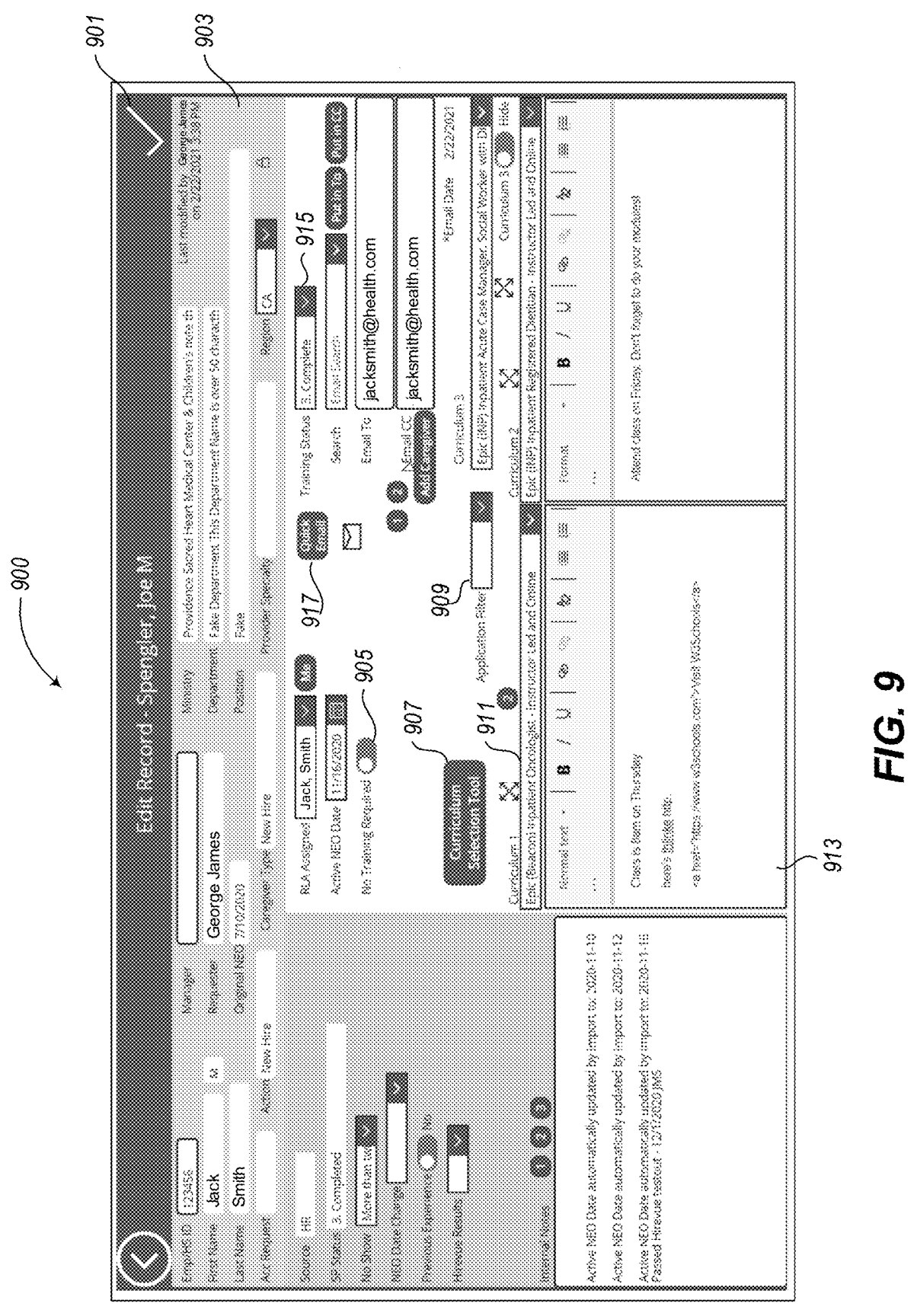

FIG. 9 is a display diagram showing a sample worker record screen 900 presented by the facility in some embodiments in order to assign training classes to a worker. The worker record screen 900 includes a confirm button 901, a worker demographic section 903, a no training required selector 905, a curriculum selection tool button 907, an application filter 909, a curriculum selector 911, a curriculum text box 913, a training status selector 915, and a quick email button 917. In some embodiments, the worker record screen 900 includes other interface elements, such as a log of the changes made on the record screen 900, additional curriculum selectors, internal notes, etc. In some embodiments, the worker record screen 900 includes data for training classes which are currently assigned to a worker.

The worker demographics section 903 includes information indicating the demographics for the selected worker, such as their name, their position, their type, their employment start date, etc. The no training required selector 905 is used to indicate whether or not the worker requires a training class. The curriculum selection tool button 907 presents a curriculum selection tool screen used to select a training class. The application filter 909 includes information indicating groups of training classes. When a user selects a group from the application filter 909, the facility updates the curriculum selector 911 to include training classes included in the selected group.

The curriculum selector 911 includes the names of different training classes, and may be used to select a training class. In some embodiments, only training classes accessible by the worker may be included in the curriculum selector 911. The curriculum text box 913 includes information indicating text data describing the training class. The data describing the training class is transmitted to the worker when the training class is assigned to the worker. In some embodiments, the text data is temporary data that is maintained throughout a user session, such as the "quick texts" defined by using the quick texts button 707 of FIG. 7. For example, the text data may be defined when a first worker is assigned a training class. The facility then stores the text data temporarily, and applies the text data to the curriculum text box 913 of a second worker when the curriculum is chosen for the second worker. The facility deletes the text data when the user session ends. The training status selector 915 indicates the status of the training. The user may select the status of the training, such as in progress, not started, complete, skipped, etc. In some embodiments, the facility obtains an indication from a provider of the training class of whether the worker has completed the training class. When a user activates the quick email button 917, the facility generates an email to the one or more other workers, such as those identified in the "email to" and "email cc" boxes, and sends the email to the one or more workers. In some embodiments, the email is generated based on the training status indicated in the training status selector 915. In some embodiments, the facility presents a visual indication to the user that a new email regarding the training class has been received.

When the confirm button 901 is activated, the facility saves the current status of each of the text boxes, selectors, and other interface components of FIG. 9. In some embodiments, the facility assigns each of the training classes to the worker by sending the worker information to one or more providers of the training classes. In some embodiments, once a training class is assigned to a worker, the facility collects correspondence regarding the training class, such as messages between a worker and their supervisor, messages from the training class provider, etc. In some embodiments, the correspondence is collected by using a "shared mailbox" for emails. In some embodiments, the facility collects the correspondence by searching the correspondence for mention of the training class. In some embodiments, when generating a "quick email" through the quick email button 917, the facility appends at least a portion of the collected correspondence.

Figure 10:
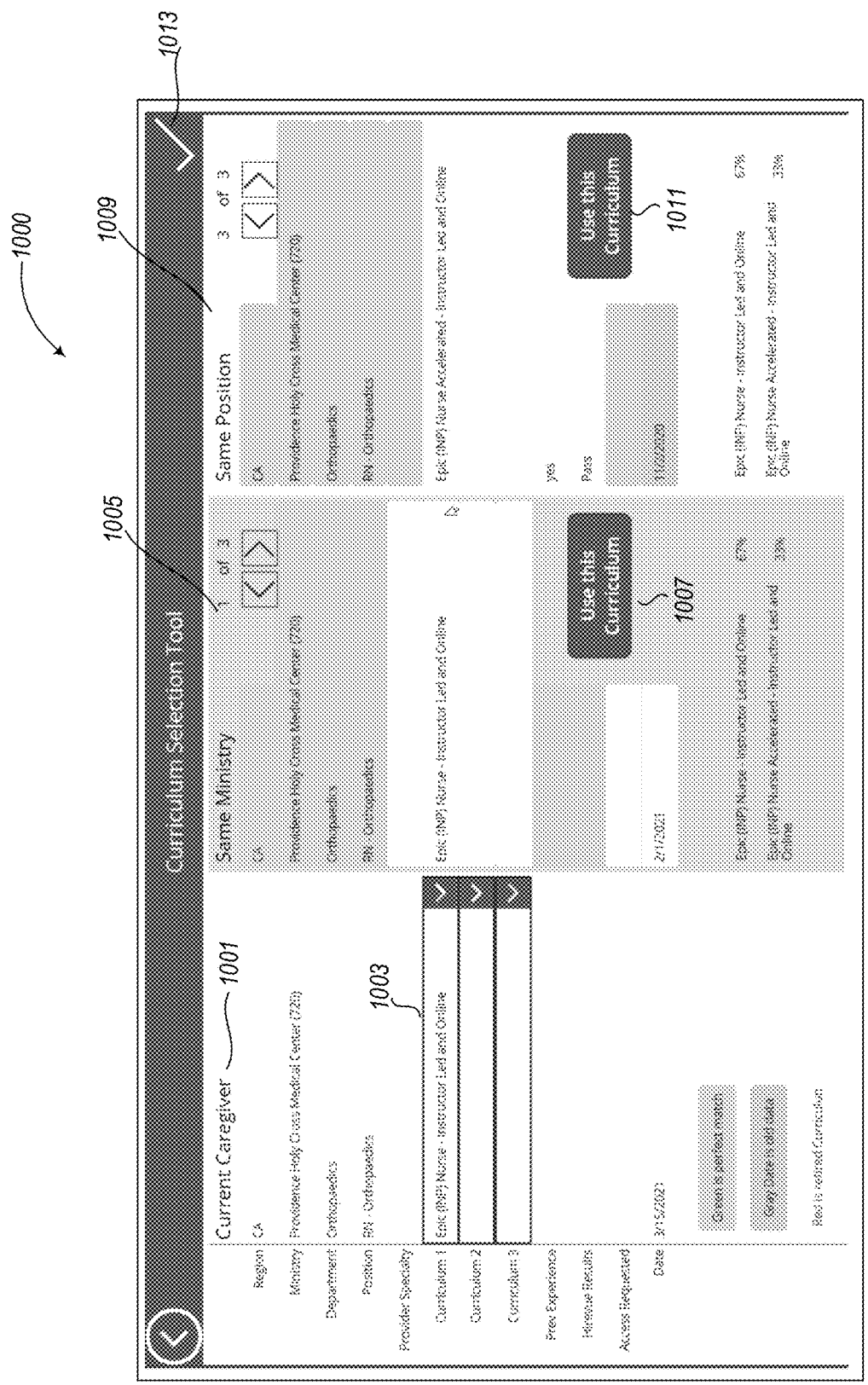
FIG. 10 is a display diagram depicting a sample curriculum selection tool screen presented by the facility in some embodiments in order to suggest training classes for a worker.

FIG. 10 is a display diagram depicting a sample curriculum selection tool screen 1000 presented by the facility in some embodiments in order to suggest training classes for a worker. The curriculum selection tool screen 1000 includes a caregiver information section 1001, a curriculum selector 1003, a same ministry section 1005, a use this curriculum button 1007, a same position section 1009, a use this curriculum button 1011, and a confirm button 1013. The curriculum selection tool screen 1000 may be accessed by clicking the curriculum selection tool button 907 of FIG. 9.

The caregiver information section 1001 includes information regarding the worker's department, region, position, and other information used to identify the worker. The curriculum selector 1003 operates in a similar manner to the curriculum selector 911. The same ministry section 1005 includes information identifying training classes attended by similar workers in the same region or branch of the organization. The use this curriculum button 1007 selects the indicated curriculum in the same ministry section 1005 to be assigned to the worker. The same position section 1009 includes information identifying training classes attended by similar workers with the same position throughout the organization. The use this curriculum button 1011 selects the indicated curriculum in the same position section 1009 to be assigned to the worker. In some embodiments, the facility displays a predetermined number of the most common training class assignments for a position in the position section 1009 or a region or branch in the ministry section 1005, such as, for example, the 3 most commonly assigned classes. In some embodiments, the facility presents visual information indicating how often each training class is assigned. In some embodiments, the facility updates which classes are most commonly assigned, how often the class is assigned, etc., whenever a training class is assigned to a worker.

In some embodiments, the facility rates the compatibility of the training class to the worker based on data describing the training class, data describing the worker, how recently the training class was used, whether an updated version of the training class exists, etc. In some embodiments, the facility visually indicates the compatibility of the training class, such as by displaying a green color around a description of the training class, displaying a percentage representing the compatibility, etc. In some embodiments, the facility displays how many other workers within the same region or same position have taken the training class. In some embodiments, the facility uses one or more of: the compatibility information and whether other workers in the same position or region have taken the class to make a recommendation of which class to assign to the worker. When the confirm button 1013 is activated, the facility returns to the caregiver screen 800 and populates the curriculum selectors and curriculum text boxes with the selected training class data.

Figure 11:
FIG. 11 is a display diagram depicting a sample training class screen presented by the facility in some embodiments in order to present training class data to a user.

FIG. 11 is a display diagram depicting a sample training class screen 1100 presented by the facility in some embodiments in order to present training class data to a user. The sample training class screen 1100 includes a curriculum name column 1101, a number of caregivers column 1103, and a region section 1105. The training class screen 1100 displays training classes obtained by the facility to a user. The curriculum name column 1101 includes information describing the name of training classes obtained by the facility. The number of caregivers column 1103 includes information indicating the number of caregivers assigned to the training class. The region section 1105 includes a selector and other user interface elements used to filter the training classes. In some embodiments, the facility displays additional training class information for a training class listed in the sample training class screen 1100 when a user interacts with the displayed information for the training class. In some embodiments, the facility presents another screen displaying information for a training class, and which allows a user to assign students to the training class.

FIG. 12 is a table diagram showing sample contents of an assigned training class data table 1200 used by the facility in some embodiments to store data regarding whether a worker has completed a training class. Rows 1201-1207 of assigned training class data table 1200 each include data indicating whether specific workers completed specific training classes. The rows are divided into the following columns: a training class id column 1210, an assigned worker column 1211, and a class completed column 1212. The training class id column 1210 includes information identifying a specific training class. The worker id column 1211 includes information identifying a specific worker assigned to the training class. The class completed column 1212 includes information specifying whether a worker completed the training class. For example, row 1201 indicate that the worker whose id is 1111 has not yet completed training class T1000. However, row 1204 indicates that worker 1111 has completed training class T3000.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. One or more instances of non-transitory computer-readable media collectively having contents configured to cause a computing device to perform a method for organizing worker records to assign training, the method comprising:
   obtaining new worker records identifying one or more workers;
   accessing existing worker records from a repository of worker records, wherein at least one of the new worker records is a redundant record of at least one of the existing worker records, the repository of worker records being stored on one or more electronic storage devices;
   identifying one or more existing worker records that have at least one empty data field;
   identifying at least one distinguished record created within a threshold amount of time included in the existing worker records based on the one or more existing worker records that have at least one empty data field;
   identifying at least one redundant record based on a comparison of the at least one distinguished record and the new worker records;
   merging, within the repository of worker records, the new worker records with the existing worker records into merged worker records;
   extracting information from the at least one redundant record;
   updating the at least one distinguished record based on the information extracted from the at least one redundant record;
   removing the at least one redundant record from the repository of worker records;
   presenting visual information describing each of one or more training classes that may be assigned to at least one of the one or more workers; and
   obtaining user input specifying that at least one of the one or more training classes be assigned to the at least one of the one or more workers.

2. The one or more instances of non-transitory computer-readable media of claim 1, the method further comprising:
   identifying at least one potential redundant record from the merged worker records; and
   flagging the at least one potential redundant record as a potential redundant record.

3. The one or more instances of non-transitory computer-readable media of claim 1, the method further comprising:
   identifying at least one worker characteristic for a worker identified in the merged worker records;
   identifying at least one training class characteristic in the at least one of the one or more training classes;
   determining whether the at least one worker characteristic and the at least one training class characteristic are compatible; and
   presenting a recommendation that the worker be assigned to at least one training class based on the determination that the at least one worker characteristic and the at least one training class characteristic are compatible.

4. The one or more instances of non-transitory computer-readable media of claim 1, the method further comprising:
   identifying a plurality of workers who are assigned to a same training class;
   identifying the plurality of workers as a group of workers; and
   presenting a suggestion that the same training class be assigned to a new worker when the new worker is added to the group of workers.

5. The one or more instances of non-transitory computer-readable media of claim 4, the method further comprising:
   obtaining user input specifying the at least one of the one or more training classes to be assigned to the group of workers.

6. The one or more instances of non-transitory computer-readable media of claim 1, the method further comprising:
   obtaining one or more characteristics of the one or more training classes;
   identifying the one or more training classes as a group of training classes based on the one or more characteristics of the one or more training classes;
   receiving an indication of a worker;
   determining whether the worker has a characteristic which is compatible with the one or more characteristics of the group of training classes; and
   presenting the group of training classes based on a determination that the worker has the characteristic which is compatible with the one or more characteristics of the group of training classes.

7. The one or more instances of non-transitory computer-readable media of claim 1, the method further comprising:
   obtaining data identifying one or more additional training classes from one or more training class repositories after a predetermined time period;
   merging the data identifying the one or more additional training classes with data identifying the one or more training classes into merged training class data, wherein at least one of the one or more additional training classes is a redundant training class of the one or more training classes;
   identifying at least one redundant training class; and
   removing data identifying the at least one redundant training class from the merged training class data.

8. The one or more instances of non-transitory computer-readable media of claim 1, the method further comprising:

detecting a start of a user session;

obtaining user input indicating training class data when at least one of the one or more workers is assigned a training class, wherein the training class data is applied to the training class for each worker assigned to the training class;

storing the training class data;

applying the training class data to each subsequent worker assigned to the training class;

detecting an end of the user session; and in response to detecting the end of the user session, deleting the training class data.

9. The one or more instances of non-transitory computer-readable media of claim 1, the method further comprising:

obtaining an indication that a worker has completed a training class.

10. The one or more instances of non-transitory computer-readable media of claim 1, the method further comprising:

obtaining data regarding a supervisor for a worker when the worker is assigned to a training class.

11. The one or more instances of non-transitory computer-readable media of claim 10, the method further comprising:

determining whether the worker completed the training class;

obtaining contact information for the supervisor from the data regarding the supervisor; and notifying the supervisor of the determination of whether the worker completed the training class by using the contact information for the supervisor.

12. The one or more instances of non-transitory computer-readable media of claim 1, the method further comprising:

accessing a repository of communications; and identifying communications within the repository of communications which pertain to at least one training class assigned to a worker.

13. A system for organizing worker records to assign training, the method comprising:

a computing device configured to assign training to workers, the computing device being further configured to:

obtain new worker records identifying one or more workers;

access existing worker records from a repository of worker records, the repository of worker records being stored on one or more electronic storage devices;

merge, within the repository of worker records, the new worker records with the existing worker records into merged worker records, wherein at least one of the new worker records is a redundant record of the existing worker records;

identify one or more records within the repository of worker records with at least one empty data field;

designate the one or more records within the repository of worker records with the at least one empty data field and that were created within a threshold amount of time as recently created records;

identify at least one redundant record based on a determination that the at least one redundant record is a recently created record;

remove the at least one redundant record from the repository of worker records by:

identifying at least one corresponding redundant record in the new worker records;

extracting data from the at least one corresponding redundant record that is different from data included in the at least one redundant record;

updating the at least one redundant record to include at least a portion of the extracted data; and deleting the at least one corresponding redundant record;

present visual information describing one or more training classes; and obtain user input indicating that at least one of the one or more training classes is assigned to at least one of the one or more workers.

14. The system of claim 13, wherein the computing device is further configured to:

identify at least one potential redundant record from the merged worker records; and flag the at least one potential redundant record as a potential redundant record.

15. The system of claim 13, wherein the computing device is further configured to:

identify at least one worker characteristic for a worker identified in the worker records;

identify at least one training class characteristic in at least one of the one or more training classes;

determine whether the at least one worker characteristic and the at least one training class characteristic are compatible; and present a recommendation that the worker be assigned to the at least one training class based on the determination that the at least one worker characteristic and the at least one training class characteristic are compatible.

16. The system of claim 13, wherein the computing device is further configured to:

identify a plurality of workers who are assigned to a same training class;

identify the plurality of workers as a group of workers; and present a suggestion that the same training class be assigned to a new worker when the new worker is added to the group of workers.

17. The system of claim 16, wherein the computing device is further configured to:

obtain user input specifying the at least one of the one or more training classes to be assigned to the group of workers.

18. The system of claim 13, wherein the computing device is further configured to:

obtain one or more characteristics of the one or more training classes;

identifying the one or more training classes as a group of training classes based on the one or more characteristics of the one or more training classes;

receiving an indication of a worker;

determining whether the worker has the characteristic which is compatible with the one or more characteristics of the group of training classes; and presenting the group of training classes based on a determination that the worker has a characteristic which is compatible with the one or more characteristics of the group of training classes.

19. The system of claim 13, wherein the computing device is further configured to:

obtain data identifying one or more additional training classes from one or more training class repositories after a predetermined time period;

merge the data identifying one or more additional training classes with data identifying the one or more training classes into merged training class data, wherein at least one of the one or more additional training classes is a redundant training class of the one or more training classes;

identify at least one redundant training class; and remove data identifying the at least one redundant training class from the merged training class data.

20. The system of claim 13, wherein the computing device is further configured to:

detect a start of a user session;

obtain user input indicating training class data when at least one of the one or more workers is assigned a training class, wherein the training class data is applied to the training class for each worker assigned to the training class;

store the training class data;

apply the training class data to each subsequent worker assigned to the training class;

detect an end of the user session; and in response to detecting the end of the user session, deleting the training class data.

21. The system of claim 13, wherein the computing device is further configured to: obtain an indication that a worker has completed a training class.

22. The system of claim 13, wherein the computing device is further configured to:

obtain data regarding a supervisor for a worker when the worker is assigned to a training class.

23. The system of claim 22, wherein the computing device is further configured to:

determine whether the worker completed the training class;

obtain contact information for the supervisor from the data regarding the supervisor; and notify the supervisor of the determination of whether the worker completed the training class by using the contact information for the supervisor.

24. The system of claim 13, wherein the computing device is further configured to:

access a repository of communications; and identify communications within the repository of communications which pertain to at least one training class assigned to a worker.

\* \* \* \* \*